United States Patent [19]

Enenshtein et al.

[11] 4,077,946
[45] Mar. 7, 1978

[54] CONTINUOUS PROCESS OF PRODUCING POLYLAUROLACTAM

[76] Inventors: Gennady Abovich Enenshtein, ulitsa Chernyshevskogo 25, kv.9; Alexandr Vladimirovich Berezovsky, ulitsa Plekhanova, 24, korpus, 1, kv. 48; Marina Konstantinovna Dobrokhotova, Dubininskaya ulitsa, 6, kv. 93; Evgenia Konstantinovna Lyadysheva, Shosse Entuziastov, 188/2, kv. 13; Larisa Alexeevna Nosova, Altaiskaya ulitsa, 24, kv. 44; Siyar Nurgalievich Nurmukhomedov, ulitsa Stalevarov, 4, korpus 3, kv. 279; Evgenia Lvovna Tarasova, prospekt Kalinina, 31, kv. 65, all of Moscow; Sergei Sergeevich Gusakov, ulitsa Zavodskaya, 1a, kv. 1, Pavlovo-Posad Moskovskoi Oblasti; Lazar Davydovich Pertsov, ulitsa Zelendolskaya, 12, kv. 119, Moscow; Igor Alexandrovich Ebel, ulitsa Moskovskaya, 1, kv. 153, Ljubertsy Moskovskoi oblasti, all of U.S.S.R.

[21] Appl. No.: 649,515

[22] Filed: Jan. 15, 1976

[51] Int. Cl.² .............................................. C08G 69/16
[52] U.S. Cl. .................................................. 260/78 L
[58] Field of Search ...................................... 260/78 L

[56] References Cited

U.S. PATENT DOCUMENTS

| | | | |
|---|---|---|---|
| 3,317,482 | 5/1967 | Kunde et al. | 260/78 L |
| 3,321,447 | 5/1967 | Kunde et al. | 260/78 L |

*Primary Examiner*—Harold D. Anderson
*Attorney, Agent, or Firm*—Haseltine, Lake & Waters

[57] ABSTRACT

A process of producing polylaurolactam comprising the steps of hydrolytic polymerization of laurolactam is performed in the presence of water, orthophosphoric and dicarboxylic acids at a temperature from 280° to 310° C under a pressure from 70 to 120 atm, leading to the formation of reaction mixture containing prepolymerizate and water, said mixture being a homophase system; removing water from said mixture by throttling said mixture down to a pressure of 0.1–0.005 atm under isothermal conditions at a flow rate of 20–90 m/sec; subsequent polymerization of the prepolymerizate accomplished in a layer at a temperature of 280°–300° C, which is 0.5–2.00 mm thick.

The process of the invention makes it possible to obtain a high quality end product by simple technology. Running of the continuous process under said conditions allows reduction of the time of the polylaurolactam production as compared to the prior-art processes.

3 Claims, No Drawings

CONTINUOUS PROCESS OF PRODUCING POLYLAUROLACTAM

The present invention relates to processes of producing polylaurolactam, one of the newest polyamides.

Polylaurolactam finds wide application as insulation for cables in the form of hoses and tubes used in automobile and machine-building industries, in the form of films for packing food stuffs, medical tools, and hot-hardening adhesives. Polylaurolactam is used in sheet form for making seals and gaskets, containers for agricultural chemicals and oils. In addition, polylaurolactam has application in manufacturing filter fabrics (instead of metal gauzes, tooth brushes, special types of clothing, and many other structural materials).

Known in the art are continuous processes of producing polyamides from lactams. As a rule, these processes comprise two main technological stages. The first one is heating of the starting components under pressure laurolactam, an activator, a polymerization catalyst and a molecular weight regulator up to the lactam polymerization reaction temperature with the formation of a reaction mixture containing prepolymerizate and water. The polymerization reaction temperature is higher than the melting points of lactam and of the desired polymer, so that in the course of the process they are in a liquid state, i.e., in the form of a melt. The presence of water in the reaction mixture causes an additional rise of the pressure therein. After a certain degree of lactam conversion is attained, an intermediate stage is carried out, namely the reduction of the pressure in the reaction mixture resulting in the evaporation of water and of the unreacted monomer in case of its incomplete conversion. These two substances are removed from the reaction mixture. However, not all of the water is removed but only most of it, namely the amount of water in excess of the amount required for activation, plus the water released in the reaction due to chain termination and condensation after the lactam ring opening and prepolymerizate formation. Along with water and monomer vapors, other volatile products (dimers, trimers, etc.) may also evaporate.

The second stage consists in further polymerization of the prepolymerizate up to the necessary conversion under the effect of temperature and under pressure of 1 atm or less. This is accomplished by the removal of the remaining water dissolved in the prepolymerizate and the polymer formed as well as of the water released during the subsequent polymerization. Though no complete removal of water can be attained, its residual content in the polymer must be within the adopted standards.

For example, known in the art is a continuous process of producing polylaurolactam consisting in polymerization of lactam in the presence of water as the process activator, orthophosphoric acid as the catalyst, and a dicarboxylic acid (for example, adipic acid) as the molecular weight regulator for the forming polymer. Said mixture of the components, preheated up to a temperature 30°-50° C below that of polymerization is fed into a polymerization apparatus made as a coiled tube wherein at 280°-310° C and 7-8 atm a reaction mixture containing water and prepolymerizate is formed. From the apparatus the reaction mixture is delivered to the upper portion of a vertical column-type vessel where at 280°-300° C and under above-specified pressure the final polymerization of the prepolymerizate takes place as said mixture moves downward. The end product is discharged from the bottom of the vessel.

The above process has following disadvantages.

1. The presence at the first stage, i.e., in the coiled tube, of the heterophase reaction system, namely, prepolymerizate melt-water vapors, since at 280°-310° C the pressure of the saturated water vapor is 65.5-100.6 atm while in the coiled tube the pressure is only 7-8 atm. Under such conditions a two-phase flow of the reaction mixture moves along the coiled tube, this flow consisting of a liquid phase (prepolymerizate melt) and a vapor phase (vapor-gas bubbles of water and monomer), these phases either alternating vertically as streaks in the tube or the liquid phase moving as a ring along the inner wall of the tube and the vapor phase moving at the center of the tube. In such a heterophase reaction system the prepolymerizate is formed at the interface with an insufficiently developed contact surface of the reactants, which adversely affects the polymerization rate. Besides, the above-cited types of phase flow sharply reduce the throughput capacity of the apparatus in terms of the main product, i.e., polymer.

2. The performance of the second stage of polymerization in a large volume of the viscous mass of the polymer formed from the prepolymerizate in the vertical vessel hinders rapid and most complete removal of the volatile products from the reaction zone and, consequently, the shift of the reaction equilibrium towards the polymer formation and increase in the polymerization rate. The rate of liberation of the volatile products is lowered by the great volume of the polymer melt the viscosity of which grows especially fast at the end of the polymerization process.

3. The performance of the second stage of polymerization under the same pressure as at the first stage and the flow of the polymer melt in the vertical vessel by gravity without stirring do not contribute to the intensification of the removal of the volatile products either since, the rate of their liberation is low due to the high viscosity of the mass and insufficient turbulization of the flow. This causes low mass transfer to the vapor phase and diminishes the polymerization rate.

4. It is necessary to remove water vapors and the unreacted monomer before the final polymerization of the prepolymerizate. The above method, however, does not include this technological operation, though it is known for all polyamides that the removal of the mentioned components favors the completion of the reaction and increases the polymer yield.

The reproduction of this process with a view to producing polylaurolactam yields the latter during 20-25 hours with a content of low molecular weight compounds of 6-7% by weight and a specific viscosity of 0.28-0.30 units measured at 25° C in 0.5% solution of metacresol. For manufacturing articles from such a product, additional polymerization is needed since polylaurolactam must contain only 1.5-2% by weight of low molecular weight products and have a specific viscosity of 0.7-0.8 units to meet the quality requirements. According to another continuous process of producing polylaurolactam, the starting components, water and laurolactam, heated up to 310° C, are continuously fed into a vertical cylindrical polymerization apparatus where this reaction temperature is maintained. The pressure in the polymerization apparatus is 16 atm. Under these conditions the reaction mixture is a heterophase system. The mixture containing the prepolymerizate and water stays for 8 hours after which it flows to another similar polymerization apparatus. In the latter said mixture stays for 3 hours at 290° C and reduced pressure. Under these conditions the water evaporates, the vapors are continuously removed from the upper portion of the polymerization apparatus and subsequent polymerization of the prepolymerizate takes place. After the removal of the water vapors the resulting prepolymerizate is subjected to final polymerization in its thin layer at 300° C in a nitrogen stream. The final polylaurolactam has a mean degree of conversion of 190 and a low molecular weight product content of 1.8% by weight.

This process is more effective than the previous one. However, some disadvantages are inherent in it as well. These include, for example, the presence of a heterophase system at the first stage of the process, i.e., in the first polymerization apparatus, since the pressure of water vapors at 330° C is 131.3 atm which is high compared to 16 atm. The disadvantages of polymerization being conducted in a heterophase reaction system are described above. Besides, an additional polymerization apparatus is used for the removal of water vapors and subsequent polymerization of the prepolymerizate, which complicates the process.

The rate of subsequent polymerization in the second polymerization apparatus is lowered due to the fact that polymerization is run in a great volume of the prepolymerizate melt filling this polymerization apparatus even though the pressure is reduced. The disadvantages of such a manner of polymerization are also described above. All these disadvantages inherent in the process cited above result in a rather prolonged time of polymerization which is about 13 hours.

It is an object of the invention to provide a process of producing polylaurolactam which will make it possible to obtain a high quality end product by simple technology in a shorter period of time.

In accordance with this and other objects of the invention consists of a process of producing polylaurolactam by hydrolytic polymerization in the presence of water, orthophosphoric acid and a dicarboxylic acid at 280°-310° C and under elevated pressure with the formation of a reaction mixture containing prepolymerizate and water, with subsequent removal of water from said reaction mixture by reducing the pressure during the flow of the mixture and with subsequent polymerization of the prepolymerizate in a thin layer thereof at 280°-300° C. According to the invention, laurolactam polymerization is run under a pressure of 70-120 atm with the formation of said mixture, being a homophase system, which is throttled uner isothermal conditions down to a pressure of 0.1-0.005 atm at a flow rate of said mixture of 20-90 m/sec and subsequent polymerization of the prepolymerizate is run in a 0.5 - 2.00 mm thick layer. Correct choice of the pressure during the course of polymerization depending on its temperature and especially at the initial stage when the lactam ring opens as well as at the stage of the prepolymerizate formation is of decisive importance. The correct choice of pressure determines the total run time of the polymerization process and affects the yield of the polymer formed.

It has been established that if the initial stage of laurolactam polymerization is accomplished within the pressure range from 70 to 120 atm and at a temperature of the process from 280°-310° C, the rate at the polylaurolactam formation is very high. It should be borne in mind that the relationship between the chosen temperature and pressure must be definite and not arbitrary within said temperature and pressure ranges. Only in this case polymer of a proper quality can be obtained in a short period of time. Thus, for example, at a temperature of 280° C and a pressure of about 100 atm the prepolymerizate formed contains approximately 6% by weight of low molecular weight compounds 1 hour after, the beginning of the reaction. Further decrease in this value is very slow. At temperatures above 310° C and the same pressure depolymerization of the prepolymerizate formed is observed even 30-40 minutes after the beginning of the reaction. Higher pressures do not affect this process. This illustrates the effect of the temperature range.

As far as the relationship between pressure and temperature in the reaction mixture is concerned, it should be pointed out that the working pressure must be such as to prevent cavitation in the reaction mixture. For example, if hydrolytic polymerization of laurolactam is carried out at 280° C, the pressure may be within the range 70-100 atm; at 310° C this range is 105-120 atm. The lower limit of the pressure range is determined by the appearance of cavitation, i.e., the formation of a vapor-gas phase in a liquid phase; the origination of cavitation will cause polymerization to proceed in the heterophase reaction system with all the ensuing disadvantages mentioned above.

The observance of the pressures cited above precludes the cavitation and favors the formation of a homophase system, which sharply accelerates polymerization due to a considerable increase in the phase contact surface area. The reaction mixture must be stirred to level off the temperature profile of the flow. The upper limit of the pressure range is determined by the fact that, in case it is extremely high the equipment of the first stage becomes sophisticated and expensive, the operating costs go up and, hence the cost of the end product rises. If the pressure value at which liquid becomes practically compressible (for example, 200 atm) is not taken into account, exceeding the upper limit does not increase the polymerization rate.

It has been established that it is most expedient to remove water from the reaction mixture by throttling it down to the selected value of 0.1-0.005 atm when it flows under isothermal conditions, i.e., at a temperature equal to that of the mixture cited above under a pressure of 70-120 atm.

It is necessary, however, that the flow rate be within a range of 20-90 m/sec. When it exceeds 90 m/sec a considerable cooling of the prepolymerizate melt is observed due to an intensive evaporation of the moisture, as well as its mechanical-chemical destruction. To offset the melt cooling, it must be overheated by 30°-80° C, which in its turn, favors thermal destruction of the polymer and greater scattering of its molecular weight distribution.

The melt flow rate below 20 m/sec can be used in the case of low flow rates of the starting components and under pressures at the first stage below 70 atm and be controlled at this stage by the known methods. At pressures considered by us the flow rate below 20 m/sec involves technological difficulties and is uneconomical.

Upon throttling, water and other volatile products, for example, dimers, trimers, etc., evaporate and break the reaction mixture into drops. The removal of said volatile products from such drops proceeds most rapidly and completely.

The flow rate of the vapor-liquid mixture thus formed is damped and its pressure is gradually reduced by creating hydraulic resistance to its flow by way of effecting multiple frequent breaking of its movement in a sequence of local resistances.

It is expedient to run the final stage of the prepolymerizate polymerization in a thin layer of its melt since only in this case the whole depth of the layer is uniformly heated thus excluding uneven conversion. This fact is extremely important since it ensures uniform conversion of the end product and, consequently, its high quality and stable properties. The most suitable thickness of a melt layer proved to be 0.5–2.0 mm. It is very difficult to set the thickness less than 0.5 mm because its fluctuations within a range of 0.1 mm about the means value of 0.5 mm are commensurate with the latter but add much to the complexity of the process equipment and affect the uniformity of the polymerization conversion. When the layer thickness exceeds 2 mm the polymerization rate falls sharply and prolonged time is needed to obtain a high quality product. For example, more than 2 hours are needed to produce polymer with a content of low molecular weight products not more than 2 wt %.

As far as the temperature of the final stage of polymerization is concerned, the range of 280° to 300° C is the most favorable. Although the time of attaining the preset degree of polymerization decreases with temperature, there is a greater risk of a fast and sharp increase in the viscosity and molecular weight of the polymer because of gel-effect. The operating conditions chosen for hydrolytic polymerization of laurolactam do not depend on the amounts of other ingredients of the reaction, namely water, orthophosphoric acid, dicarboxylic acid.

Carrying out of the continuous process under said operating conditions reduces the time of polylaurolactam production at least tenfold as compared to the industrial periodic process and makes it possible to obtain the polymer with required quality characteristics. As compared to the continuous prior-art process the production time is reduced at least 4–6 fold. The periodic process is chosen for comparison because of the fact that there is no continuous process for industrial by producing of polylaurolactam.

The proposed process allows the production of polylaurolactam suitable for manufacturing articles.

Polylaurolactam produced by the present process is a white solid resistant to oils, fats, hydrocarbons, petrochemicals, alcohols and ketones. It is soluble in concentrated inorganic acids, phenols, fluorinated and chlorinated alcohols. Polylaurolactam possesses all properties inherent in other polyamides, but favorably differs from them by its low density (1.01 g/cm$^3$) and enhanced resistance to water which ensures stable properties and dimensions of articles operating in media with a high moisture content.

Some properties of polylaurolactam are given below,

| | |
|---|---|
| Ultimate tensile stress, kgs/cm$^2$ | 500–550 |
| Bending stress, kgs/cm$^2$ | 550–650 |
| Yield point at elongation, kgs/cm$^2$ | 410–450 |
| Relative elongation at rupture, % | 200–280 |
| Melting point, ° C | 178–182 |
| Heat capacity at 20° C, j/kg.deg | 1220 |
| Water absorption, %: | |
| during 24 hours | 0.2 |
| during a week | 0.7 |
| during a month | 1.2 |
| maximum | 1.7 |

The proposed process is noted for its technological simplicity and is carried out as follows.

A mixture of the starting components, namely, monomer melt, water, orthophosphoric acid as the catalyst, and adipic or sebacic acid as the molecular weight regulator pre-mixed in a preset ratio are delivered with the aid of a batching device into a polymerization apparatus, where the first polymerization stage, i.e., the formation of prepolymerizate takes place under a pressure of 70–120 atm and at a temperature of 280°–310° C. For example, if polymerization is carried out at 280° C, the pressure in the reaction mixture is maintained within the range of 70–80 atm; at 300° C this range is 88–108 atm.

The volume of the homophase reaction system at the first stage and the rate of delivery of the starting components of the reaction mixture must ensure the residence time of said mixture under chosen conditions necessary for attaining the optimum degree of laurolactam polymerization, for example, containing 4–6% of low molecular weight products.

Next, the reaction mixture containing water and the prepolymerizate is throttled down to a lower pressure of about 0.1–0.005 atm. The throttling proceeds under isothermal conditions of the mixture flow at a temperature equal to that of said mixture. The flow rate must be within the range of 20–90 m/sec, since otherwise isothermal conditions are disturbed. The reaction mixture is transformed into droplets. The volatile products, namely, the remaining water and the unreacted low molecular weight compounds, evaporate intensively from the droplets. The concentration of these products in the prepolymerizate melt decreases, speeding up its final polymerization. The prepolymerizate polymerization is carried out in a layer of melt which is 0.5–2 mm thick under the above-cited low pressure and at a temperature of 280°–300° C. The remaining water dissolved in the prepolymerizate and the water liberated during its final polymerization, as well as the unreacted low molecular weight compounds, are distilled off from this layer under the cited conditions. These products are removed from the reaction zone. The layer of the polymer melt must be of even thickness in any cross section of the surface on which it is treated. This is necessary for producing a polymer of stable quality throughout the process. The surface area of the treated melt must ensure the residence time necessary for obtaining the end product with preset properties.

For a better understanding of the present invention specific examples of its preferred embodiment are given hereinbelow by way of illustration.

EXAMPLE 1

The starting mixture, i.e., a laurolactam melt, containing 10 wt % of water, 0.2 wt. % of orthophosphoric acid, and 0.2 wt. % of adipic acid with respect to the weight of lactam are fed for pre-polymerization into a first stage reactor in amounts of 3 kg/hr with the aid of a batching device, such as a piston or gear-type pump. In the reactor the reaction mixture is heated up to 290° C under a pressure of 96 atm. The reactor is a tube 12 m in length and 12 mm in inner diameter. When the content of low molecular weight products in the prepolymerizate as determined by its extraction in ethanol attains 5.5 to 5 wt % the reaction mixture containing the prepolymerizate and water is throttled down to a pressure of 0.013 atm at a temperature equal to 290° C. The flow rate is 50 m/sec and the number of local resistances of a narrow slit-type which ensures the required conditions is 360. The water and unreacted monomer evaporated under these conditions are removed from the reaction mixture and do not participate in the process. The resulting prepolymerizate is delivered into a thin-film apparatus where the prepolymerizate is finally polymerized in a 1.7–1.8 mm layer at a temperature 290° C under 0.013 atm. The residence time is 20 min. The end products contains 1.6 weight % of low molecular products and has the specific viscosity of 0.74 units as measured in a 0.5% metacresol solution at 25° C.

EXAMPLE 2

The starting mixture of the same composition and at the same flow rate as described in Example 1 is fed into a reactor for prepolymerization, where it is heated up to 280° C under 70 atm, the residence time being 80 min. Then the reaction mixture is throttled down to a pressure of 0.1 atm under isothermal conditions. The flow rate is 20 m/sec and the number of local resistances ensuring the given conditions is 425. The evaporated components are removed by following the procedure described in Example 1. The final stage of polymerization is accomplished in a 2.0 mm thick prepolymerizate layer under 0.1 atm at 300° C during 20 min. The final polylaurolactam contains 2 wt % of low molecular weight products and has a specific viscosity of 1.0 unit.

EXAMPLE 3

The starting mixture of the same composition and at the same flow rate as described in Example 1 is fed into a reactor for prepolymerization, where it is heated up to 310° C under 120 atm. When the content of low molecular weight products reaches 4.0–4.5 wt % the reaction mixture is throttled down to a pressure of 0.005 atm. The flow rate is 90 m/sec and the number of local resistances ensuring the given conditions is 335. The evaporated components are removed. The final stage of the prepolymerizate polymerization is accomplished in a 0.5 mm thick layer at 280° C under a pressure of 0.005 atm. The final polymer contains 1.8 wt % of low molecular weight compounds and has a specific viscosity of 1.2 units.

We claim:

1. A continuous process for producing polylaurolactam, which is solid at room temperature comprising hydrolytically polymerizing a moving stream of a laurolactam melt containing an activating amount of water, a catalytically effective amount of orthophosphoric acid and a molecular weight regulating amount of a dicarboxylic acid in a homophase system at a temperature of 280°–310° C under a pressure of 70–120 atmospheres with the formation of an initial reaction mixture containing a prepolymerizate and water and being a homophase system, removing water from said mixture by throttling the mixture down to a pressure of 0.1–0.005 atmosphere under isothermal conditions at a flow rate of 20–90 meters per second; and subsequently completing the polymerization of the throttled down mixture at 280°–300° C in a 0.5–2.0 millimeters thick layer thereof.

2. The process of claim 1 wherein said dicarboxylic acid is selected from the group consisting of adipic and sebacic acids.

3. The process of claim 1 wherein said homophase initial reaction mixture contains from 4–6% of low molecular weight products.

* * * * *